United States Patent [19]

Stahlke et al.

[11] Patent Number: 5,114,791
[45] Date of Patent: May 19, 1992

[54] TWO-COMPONENT INJECTION MOLDING WITH POLYARYLENE SULFIDES

[75] Inventors: Kurt-Rainer Stahlke, Kuerten; Klaus Reinking, Wermelskirchen; Erhard Tresper; Klaus Kraft, both of Krefeld; Axel Kaminski, Wermelskirchen, all of Fed. Rep. of Germany

[73] Assignee: Bayer Aktiengesellschaft, Leverkusen, Fed. Rep. of Germany

[21] Appl. No.: 305,075

[22] Filed: Feb. 2, 1989

[30] Foreign Application Priority Data

Feb. 13, 1988 [DE] Fed. Rep. of Germany ....... 3804536

[51] Int. Cl.$^5$ .............................................. C08G 75/14
[52] U.S. Cl. ...................................... 428/419; 528/388
[58] Field of Search ......................... 428/419; 528/388

[56] References Cited

U.S. PATENT DOCUMENTS

4,917,957  4/1990  Nitoh et al. ...................... 428/419

FOREIGN PATENT DOCUMENTS

0063976  5/1977  Japan .................................. 428/419
0053063  5/1981  Japan .................................. 428/419
1192547  8/1989  Japan .................................. 428/419

Primary Examiner—P. C. Sluby
Attorney, Agent, or Firm—Connolly and Hutz

[57] ABSTRACT

The invention relates to two-component injection-molded articles in which polyarylene sulfides (PAS), preferably polyphenylene sulfide (PPS), are present as at least one component and to a process for their production.

4 Claims, No Drawings

TWO-COMPONENT INJECTION MOLDING WITH POLYARYLENE SULFIDES

This invention describes two-component injection-molded articles, in which polyarylene sulfides (PAS), preferably polyphenylene sulfide (PPS), are present as at least one component and to a process for their production.

The two-component injection molding technology and corresponding processes are known (cf. for example DE-OS. 23 53 816, 35 04 816, U.S. Pat. No. 3,479,425). In two-component injection molding, the two thermoplastic components, which may be the same or different, are injected one immediately after the other (for example at a time interval of less than a second) into a mold. In one particular embodiment, the components may also be processed by integral foam molding (cf. for example Kunststoffberater $\frac{1}{2}$, 1983, pages 26 to 32).

It is possible by two-component injection molding to produce molded articles which consist of two layers of thermoplasts lying one above the other. One component forms the core of the molding while the other component (shell) surrounds the core. The core may also be filled with foam (in-mold injection). Compared with moldings produced by one-component injection molding (1C), moldings produced by two-component injection molding (2C) have better surface qualities for example.

In general, the core of the molding performs the shaping function, i.e. is responsible for stiffness, dimensional stability (for example at elevated temperature). The shell is responsible for surface quality (for example a smooth, reflective surface). The surface should lend itself, for example, to painting and metallization.

It has now been found that, by virtue of their mechanical and thermal properties, polyarylene sulfides are particularly suitable for two-component injection molding.

Accordingly, the present invention relates to two-component injection-molded articles which are characterized in that they contain a polyarylene sulfide, preferably polyphenylene sulfide, as at least one component.

The present invention also relates to a process for the production of moldings by two-component injection molding, characterized in that a polyarylene sulfide, preferably polyphenylene sulfide, is used as at least one possible component.

Polyarylene sulfides suitable for use in accordance with the invention are known and are commercially available, cf. for example U.S. Pat. No. 3,354,129, EP-OS 171 021.

Polyarylene sulfides suitable for use in accordance with the invention have a melt viscosity of 5 to 300 Pa.s/306° C.$\times 10^3$ sec$^{-1}$, as measured in a Weissenberg Rheogoniometer. They may be amorphous and (partially) crystalline. The polyarylene sulfides may be used in filled and unfilled form. They may be used as a component for the core of the injection-molded article and/or the shell of the molding. Highly filled (partially) crystalline polyarylene sulfides are preferably used for the core.

Polyarylene sulfide to be injection-molded in accordance with the invention may be filled, for example, with such additives as glass fibers, such as short glass fibers, long glass fibers, E-glass, glass beads, glass spheres, which may all optionally be coated (for example with epoxysilanes or aminosilanes), and/or with mineral fillers, such as quartz, mica, chalk, crystobalite, talcum, dolomite, kaolin, feldspar, wollastonite, heavy spar (BaSO$_4$), metal powders, metal oxdes, e.g. TiO$_2$, metal salts, carbon black, graphite, carbon fibers, pigments, etc.

In addition, standard stabilizers, pigments and standard mold release agents, such as fatty acid esters, montan wax, silicones, acid amides, metal stearates, etc., may be incorporated in the polyphenylene sulfide to be injection-molded in accordance with the invention.

Where polyarylene sulfides, preferably polyphenylene sulfide, are used in accordance with the invention, it is possible to produce an injection-molded article in which the polyarylene sulfide forms the core which is surrounded by the second component. It is also possible to produce an injection-molded article in which the polyarylene sulfide forms the shell while a second component forms the core. In addition, it is possible to produce moldings in which both the core and the shell consist of a polyarylene sulfide.

In addition to polyarylene sulfides, (partially) crystalline and amorphous thermoplasts may be used as a further component.

Suitable (partially) crystalline thermoplasts are, for example, PPS, polyamides, polyesters, such as polybutylene terephthalates (PBT), polyethylene terephthalates (PETP) or mixtures thereof, liquid crystal polymers (LCP), polyether ketones (PEK), polyether ether ketones (PEEK), etc.

Suitable amorphous thermoplastic resins are, for example special polyarylene sulfides, polycarbonates, polyester carbonate (PAR), polyether imide (PEI), polysulfone (PSU), etc.

The thermoplast used for the outer layer (surface) is mixed with 0 to 70% by weight and preferably with 0 to 10% by weight fillers; it may be amorphous or (partially) crystalline.

The thermoplast used for the core is mixed with 0 to 80% by weight and preferably with 30 to 70% by weight fillers. It is preferably (partially) crystalline. The thermoplasts to be processed in accordance with the invention should be coordinated and compatible with one another in regard to their processibility.

The moldings according to the invention produced by two-component injection molding show good adhesion between the shell (outer layer) and the core.

They show very little tendency towards disruption between the layers. In addition, they are substantially unaffected by rapidly changing temperatures and show no sign of delamination. They show very little blooming and. accordingly, may readily be metallized, printed or painted and show high surface gloss.

It is possible by two-component injection molding to produce moldings capable of withstanding high stressing which may be used, for example, as reflectors for headlamps (for example vehicle headlamps), as housings for items of technical equipment, for example bysiness machines, electronic components, circuit boards, etc.

Headlamp reflectors (for example for automobiles) may be produced with advantage by two-component injection molding in accordance with the invention. The reflector is preferably produced in such a way that the polyphenylene sulfide forms the core while another thermoplast, preferably polycarbonate, forms the shell. It is possible in this way to produce very narrow headlamps which show high heat resistance and are unaffected by sudden changes in temperature (for example under the effect of splashing water) and show high mechanical strength and excellent surfaces.

EXAMPLE 1

Comparison with one-component injection molding

A polyphenylene sulfide according to EP-OS 171 021 for example containing 45% by weight commercially available glass fibers (10 to 15 $\mu$ diameter) is compounded in a conventional injection-molding machine. The material has a viscosity $\eta$ of $1.3 \times 10^2$ Pa.s at a shear rate of $\dot{\gamma} = 10^3 \times \sec^{-1}$, as measured at 320° C. Vehicle headlamp reflectors are produced therefrom by conventional injection molding. After subsequent vacuum metallization (for example with aluminium), the reflector shows a rough surface which is unsuitable for use in car headlamps.

EXAMPLE 2

A compound of the type described in Example 1 is used as core in a Battenfeld BM-T two-component injection-molding machine. A polycarbonate (Makrolon 2805) is used as the outer skin. The reflectors obtained may readily be metallized (for example with aluminium) and show excellent surface quality. By virtue of their dimensional stability, they may also be used for prolonged periods without, for example, the light-/dark boundary of the headlamp produced from the reflector being significantly shifted.

EXAMPLE 3

A PPS compound according to Example 1 is used as the core. A PPS containing 30% by weight dolomite having a particle size of 1 to 2 pm is used as the outer skin. This compound has a viscosity $\eta$ of $8 \times 10^2$ Pa.s at a shear rate $\dot{\gamma}$ of $10^3 \times \sec^{-1}$, as measured at 320° C. The reflectors produced therefrom may be directly metallized and show excellent surface quality.

We claim:

1. In an improved two-component, core-shell, injection-molded article wherein both the two components are thermoplasts,
    the improvement comprises polyarylene sulfide being at least one of the two components.
2. Moldings as claimed in claim 1, which contain a polyarylene sulfide in the core.
3. Moldings as claimed in claim 1, wherein a polyarylene sulfide is present in the shell.
4. Moldings as claimed in claim 1, which contain a polyarylene sulfide in the shell and core.

* * * * *